US012699184B2

(12) United States Patent
Halbritter

(10) Patent No.: US 12,699,184 B2
(45) Date of Patent: Aug. 4, 2026

(54) FMCW LIDAR LASER SYSTEM AND OPERATING METHOD FOR SUCH A LASER SYSTEM

(71) Applicant: ams-OSRAM International GmbH, Regensburg (DE)

(72) Inventor: Hubert Halbritter, Dietfurt (DE)

(73) Assignee: amd-OSRAM International GMBH, Regensburg (DE)

( * ) Notice: Subject to any disclaimer, the term of this patent is extended or adjusted under 35 U.S.C. 154(b) by 934 days.

(21) Appl. No.: 17/799,299

(22) PCT Filed: Feb. 12, 2021

(86) PCT No.: PCT/EP2021/053504
§ 371 (c)(1),
(2) Date: Aug. 12, 2022

(87) PCT Pub. No.: WO2021/165157
PCT Pub. Date: Aug. 26, 2021

(65) Prior Publication Data
US 2023/0081609 A1      Mar. 16, 2023

(30) Foreign Application Priority Data

Feb. 19, 2020    (DE) ..................... 10 2020 104 385.6

(51) Int. Cl.
*G01S 17/32*        (2020.01)
*G01S 7/48*         (2006.01)
(Continued)

(52) U.S. Cl.
CPC ............ *G01S 17/32* (2013.01); *G01S 7/4808* (2013.01); *G01S 7/4816* (2013.01); *G01S 17/58* (2013.01)

(58) Field of Classification Search
CPC ...... G01S 17/32; G01S 7/4808; G01S 7/4816; G01S 17/58; G01S 17/931; G01S 7/4813; G01S 17/34
See application file for complete search history.

(56) References Cited

U.S. PATENT DOCUMENTS 4,976,539 A     12/1990  Carlson et al.
2007/0053402 A1    3/2007  Braunecker
(Continued)

FOREIGN PATENT DOCUMENTS

CN        102004255 A     4/2011
DE     102019107568 A1    10/2019
(Continued)

OTHER PUBLICATIONS

Jiang, Y. et al., "Time-stretch LiDAR as a spectrally scanned time-of-flight ranging camera", Nature Photonics, Jan. 2020, pp. 14-19, vol. 14.
(Continued)

*Primary Examiner* — Md Saiful A Siddiqui
(74) *Attorney, Agent, or Firm* — Viering, Jentschura & Partner mbB

(57)        ABSTRACT
A laser system may include a semiconductor laser configured to emit laser radiation in continuous wave operation at M modes having differing angular frequencies, where $2 \leq M$ and where $n=[1; M]$ ℕ.. A tuning apparatus may periodically modify the angular frequencies where a variation of each angular frequency is smaller by at least a factor of 2 than a mode distance between the relevant adjacent angular frequencies. A detector has an upper cutoff frequency which is smaller by at least a factor of 10 than the smallest of the mode distances. A beam splitter may guide the M modes each to the detector and to an object, such that the detector may detect, for each of the M modes, portions of the laser radiation reflected by the object and portions of the laser
(Continued)

radiation which come optically directly from the semiconductor laser.

16 Claims, 3 Drawing Sheets

(51) Int. Cl.
G01S 7/481 (2006.01)
G01S 17/58 (2006.01)

(56) References Cited

U.S. PATENT DOCUMENTS

| | | | |
|---|---|---|---|
| 2011/0051118 A1* | 3/2011 | Sato | G01S 7/4913 |
| | | | 356/5.11 |
| 2011/0292403 A1 | 12/2011 | Jensen et al. | |
| 2018/0210068 A1 | 7/2018 | Efimov | |
| 2018/0224547 A1* | 8/2018 | Crouch | G01S 17/32 |
| 2018/0267154 A1* | 9/2018 | Ootaka | G01S 7/4912 |
| 2019/0025431 A1* | 1/2019 | Satyan | G02F 1/21 |
| 2019/0154832 A1 | 5/2019 | Maleki et al. | |
| 2019/0257926 A1 | 8/2019 | Zhang et al. | |
| 2019/0257927 A1 | 8/2019 | Yao | |
| 2019/0302268 A1 | 10/2019 | Singer et al. | |
| 2019/0317219 A1 | 10/2019 | Smith et al. | |
| 2020/0142051 A1* | 5/2020 | Anderson | G01S 13/867 |
| 2020/0341127 A1* | 10/2020 | Brosche | G01S 17/58 |
| 2020/0371213 A1* | 11/2020 | Rumala | G01S 7/4808 |
| 2021/0181309 A1* | 6/2021 | Oza | G01S 7/4812 |
| 2021/0382084 A1 | 12/2021 | Imaki | |
| 2022/0413354 A1* | 12/2022 | Lukashchuk | G01S 7/4917 |
| 2023/0052690 A1* | 2/2023 | Tsuchida | G01S 17/58 |

FOREIGN PATENT DOCUMENTS

| | | |
|---|---|---|
| EP | 2405287 A1 | 1/2012 |
| WO | 2005029114 A2 | 3/2005 |
| WO | 2020188676 A1 | 9/2020 |

OTHER PUBLICATIONS

De Groot, P. et al., "Unusual techniques for absolute distance measurement", Optical Engineering, Jan. 2001, pp. 28-32, vol. 40, No. 1, Society of Photo-Optical Instrumentation Engineers.

Riemensberger, J. et al., "Massively parallel coherent laser ranging using soliton microcombs", arXiv, Dec. 24, 2019, pp. 1-18, Cornell University Library.

International Search Report issued for the corresponding international patent application No. PCT/EP2021/053504, dated Apr. 29, 2021, 3 pages (for informational purposes only).

* cited by examiner

FIG 1
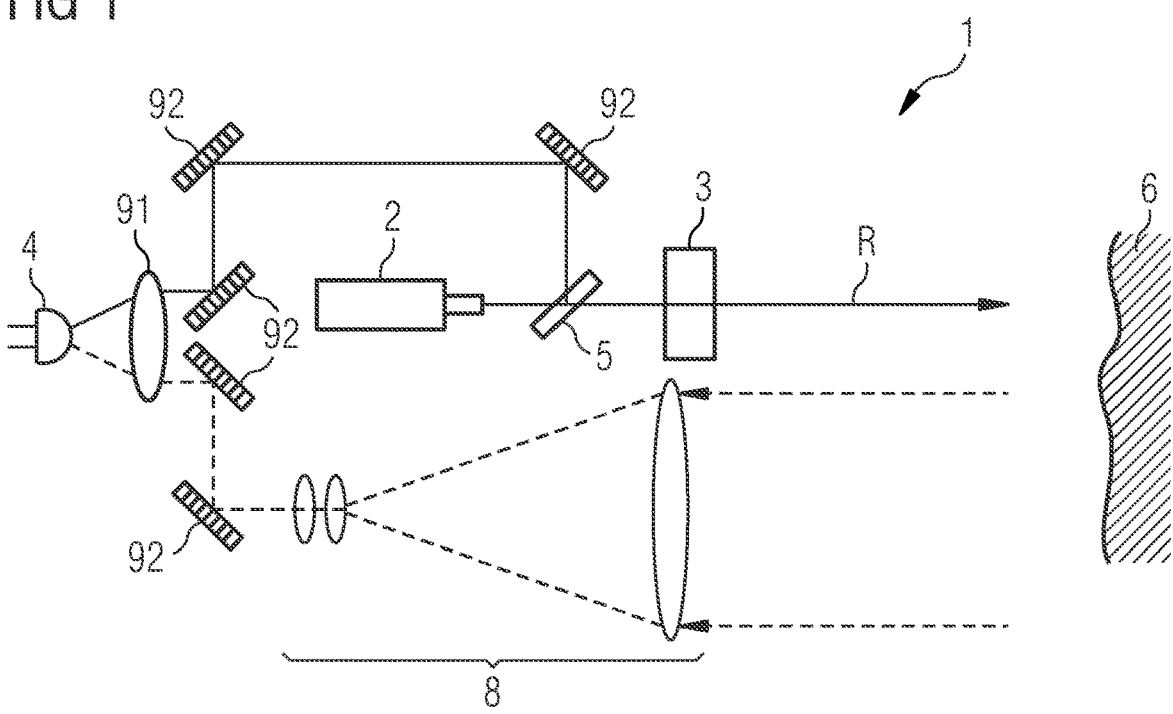
FIG 2
FIG 3
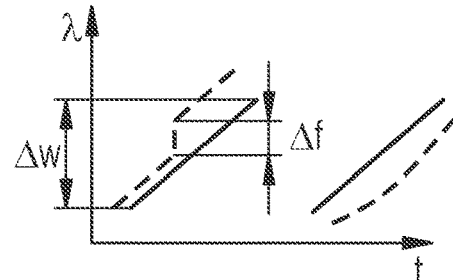

FMCW LIDAR LASER SYSTEM AND OPERATING METHOD FOR SUCH A LASER SYSTEM

CROSS-REFERENCE TO RELATED APPLICATIONS

The present application is a national stage entry according to 35 U.S.C. § 371 of PCT application No.: PCT/EP2021/053504 filed on Feb. 12, 2021; which claims priority to German patent application DE 10 2020 104 385.6, filed on Feb. 19, 2020; all of which are incorporated herein by reference in their entirety and for all purposes.

TECHNICAL FIELD

A laser system is specified. In addition, an operating method for a laser system is specified.

BACKGROUND

The documents US 2018/0210068 A1, US 2019/0302268 A1 and US 2019/0317219 A1 concern FMCW lidar systems. FMCW stands for Frequency Modulated Continuous Wave. Lidar stands for Light Detection and Ranging, i.e. optical distance measurement and speed measurement.

An objective to be solved is to provide a laser system with a high optical output power.

SUMMARY

According to at least one embodiment, the laser system comprises one or more semiconductor lasers. The at least one semiconductor laser is configured to emit laser radiation. In particular, the semiconductor laser is a continuous wave laser. In this context, the term "continuous wave laser" does not exclude the possibility that the laser is to be switched off briefly between individual frequency ramps, for example, as intended.

According to at least one embodiment, the semiconductor laser emits the laser radiation at M modes. The M modes comprise pairwise different angular frequencies $w_n$ and thus different wavelengths. The number M of the modes is at least two. The parameter n may have any integer value between 1 and M, inclusive.

According to at least one embodiment, the laser system comprises a tuning apparatus. The tuning apparatus may be configured to periodically change the angular frequencies $w_n$. That is, each of the angular frequencies $w_n$ is variable. In an embodiment, all M modes and thus all angular frequencies $w_n$ are varied together and in parallel with each other. A variation of the angular frequencies $w_n$ may be smaller by at least a factor of 2 or 5 or 10 or 50 than a mode spacing between the respective adjacent angular frequencies $w_n$. That is, the variation of the angular frequencies $w_n$ is small compared to the associated mode distances.

According to at least one embodiment, the laser system comprises one or more detectors. The at least one detector is in particular a detector diode, for example a photodiode. The detector may be single-channel or multi-channel.

According to at least one embodiment, an upper cutoff frequency of the detector is smaller than a smallest one of the mode distances between the angular frequencies $w_n$ by at least a factor of 5 or 10 or 100 or 500. That is, the detector is comparatively slow and comprises a relatively small bandwidth.

According to at least one embodiment, the laser system comprises a beam splitter. The beam splitter is configured to guide the M modes of the laser radiation on the one hand to the detector and on the other hand to an object to be detected. Thus, the detector is also configured to detect, for the M modes, portions of the laser radiation reflected from the object as well as portions of the laser radiation coming optically directly from the at least one semiconductor laser. The object is thereby not a component of the laser system. For example, the object is a road user such as a motor vehicle or a pedestrian.

Coming optically directly from the semiconductor laser means, for example, that the relevant portions of the laser radiation do not undergo any wavelength change and are handled in particular only with optically passive components such as beam splitters, mirrors and/or lenses, or that the only optically active component optionally arranged in the relevant beam path is the tuning apparatus.

In at least one embodiment, the laser system comprises a semiconductor laser configured to emit laser radiation in continuous wave mode at M modes with mutually different angular frequencies $w_n$ with $2 \leq M$ and with $n \in [1; M]_N$. Further, the laser system may include a tuning apparatus configured to periodically vary the angular frequencies $w_n$, wherein a variation of each of the angular frequencies $w_n$ is smaller by at least a factor of 2 than a mode distance between the respective adjacent angular frequencies $w_n$. A detector of the laser system comprises an upper cutoff frequency that is smaller than the smallest of the mode distances by at least a factor of 10. A beam splitter of the laser system is configured to guide the M modes of the laser radiation on the one hand to the detector and on the other hand to an object, so that the detector is also configured to detect, for the M modes, portions of the laser radiation reflected by the object as well as portions of the laser radiation coming optically directly from the semiconductor laser.

Typically, an FMCW lidar system with a single mode laser as light source requires a few 100 mW of optical output power, depending on the targeted distance, for example, at a distance of about 200 m. Such single mode laser diodes are currently not available in such a way, since typically DFB laser diodes and DBR laser diodes in ECL design emit only up to about 100 mW. DFB stands for Distributed Feedback, DBR stands for Distributed Reflector and ECL stands for External Cavity Laser. Solutions based on fiber lasers, on the other hand, are very cost-intensive compared to individual laser diodes. This applies in particular to EDFA and SOA. EDFA stands for erbium-doped fiber amplifier and SOA for semiconductor-based optical amplifier.

The laser system described herein offers a cost-effective approach to using multimode lasers with high efficiency in an FMCW lidar system, wherein a number of emitted longitudinal modes is at least two. This means that, for example, higher order gratings, which are less expensive to produce due to the lower required structural resolution, can be used and/or that complex temperature controls can be omitted. In addition, such multimode laser diodes are more efficient and can also be operated as several connected together in a single system.

Thus, a laser diode is proposed in a laser system that emits at multiple longitudinal modes, i.e., at different angular frequencies. The laser system does not require an expensive grating to be fabricated, such as is necessary for DFB lasers or DBR lasers. Alternatively, a higher order grating with larger structure sizes can be used, since such a grating is comparatively inexpensive.

Such a multimode laser diode is scalable with respect to its length to achieve the necessary coherence. For example, with a laser diode length between 5 mm and 10 mm, coherence lengths of less than 1 MHz or less than 500 kHz can be achieved for each individual mode, while at the same time achieving higher total power than comparable DFB-ECL. The frequency change of the wavelength may be imposed simultaneously for all M longitudinal modes. In the coherent detector, the different modes do not mix thereby because their distances from each other are greater than the maximum frequency modulation. For example, the frequency modulation is at a maximum of 1 GHz and the distances between the modes exceed 10 GHz in each case.

With the laser system described herein, high optical powers of much more than 100 mW can be achieved without an additional amplifier, such that an efficient FMCW lidar system is achievable. The setup of the laser described herein is a solid-state setup that does not require a costly fiber laser. Since no grating or only a higher order grating is required, manufacturing costs can be reduced.

Since optical losses at a grating are eliminated or at least significantly reduced, the semiconductor laser and thus the laser system can be operated more efficiently. In addition, the laser system can be used over a wide temperature range. Thus, an overall efficient light source can be achieved by the semiconductor laser in an FMCW lidar system.

According to at least one embodiment, the laser system is a frequency modulated continuous wave lidar system such that the detector is configured to detect an angular frequency shift based on the M modes, wherein the angular frequency shift occurs upon reflection of the laser radiation from the moving object. This makes it possible to determine a distance and/or a radial velocity of the object relative to the laser system.

According to at least one embodiment, a resonator of the semiconductor laser comprises a geometric resonator length of at least 4 mm or 5 mm or 6 mm. Alternatively or additionally, the geometric resonator length is at most 12 mm or 10 mm. The optical resonator length is obtained by multiplying the geometric resonator length with the relevant refractive index. For semiconductor lasers based on the material system GaAs, the refractive index in the relevant wavelength range from about 1 μm to 1.5 μm is about 3.2.

According to at least one embodiment, the geometrical resonator length of the semiconductor laser is defined by facets of the semiconductor laser. In particular, the resonator formed by the semiconductor laser itself is the only resonator in the laser system. If multiple semiconductor lasers are present in the laser system, each semiconductor body of the semiconductor lasers may form its own resonator without the presence of additional resonators.

According to at least one embodiment, the laser system comprises a mode limiting apparatus. The mode limiting apparatus is configured to limit M to at most 10 or to at most 5. That is, it is then $2 \leq M \leq 5$ or $2 \leq M \leq 10$.

According to at least one embodiment, the mode limiting apparatus is formed by a higher order diffraction grating and/or by an optically narrow band coating. In particular, the diffraction grating is a second order, third order or fourth order grating. For example, second order grating means that the grating per se is designed for a first order wavelength of 1800 nm, wherein the laser radiation is at about 900 nm.

According to at least one embodiment, the mode limiting apparatus is integrated in the semiconductor laser or on the semiconductor laser. That is, the semiconductor laser and the mode limiting apparatus are formed integrally. For example, the semiconductor laser is then a DFB laser with a higher order grating structure. Furthermore, it is possible that the facets of the semiconductor laser are provided with a corresponding mode-limiting optical coating or coatings. That is, there is no external cavity or resonator path outside the semiconductor laser that could accommodate a mode-limiting apparatus such as a grating.

According to at least one embodiment, the semiconductor laser or the laser system is free of a mode limiting apparatus. That is, in a resonator for the laser radiation, inside the semiconductor laser or also outside the semiconductor laser, no mode limiting apparatus is placed. In this case, it is in particular that at least six or 11 of the modes are present. Alternatively or additionally, the number M of modes is at most 30 or 20 or 15. That is, for example, $6 \leq M \leq 20$ or $11 \leq M \leq 30$ applies.

According to at least one embodiment, the tuning apparatus is partially or fully integrated in the semiconductor laser. In this case, the tuning apparatus is configured in particular to vary an operating current intensity. For the required variation of the angular frequencies $w_n$, an operating current intensity variation of at most 1% or of at most 0.2% is sufficient. This means that the required variation of all angular frequencies $w_n$ can be achieved with already moderate changes in operating current intensity.

According to at least one embodiment, the tuning apparatus is located completely outside the semiconductor laser. In this case the tuning apparatus is realized for example by an acousto-optic modulator, abbreviated AOM, or by a Mach-Zehnder structure.

According to at least one embodiment, the mode distances are each at least 5 GHz or 10 GHz or 20 GHz. Alternatively or additionally, the mode distances are less than 0.9 THz or 0.7 THz or 0.5 THz.

According to at least one embodiment, the variations of each of the angular frequencies $w_n$ are each at least 0.2 GHz or 0.4 GHz. Alternatively or additionally, these variations are at most 4 GHz or 2 GHz or 1 GHZ.

According to at least one embodiment, the M modes each comprise a mode width of at most 5 MHz or 1 MHz or 0.6 MHz. That is, the M modes are spectrally comparatively narrow. It is possible that the mode widths are each at least 10 kHz or 100 kHz or 0.2 MHz.

According to at least one embodiment, an average wavelength of the laser radiation is at least 850 nm or 905 nm. Alternatively or additionally, the average wavelength is at most 1600 nm or 1550 nm. In particular, the average wavelength is between 905 nm to 970 nm, inclusive, or in the region of 1500 nm to 1550 nm, inclusive.

According to at least one embodiment, a temporal change of the average wavelength is smaller by at least a factor $10^3$ or $10^4$ or $10^6$ than a temporal change of the angular frequencies $w_n$ as caused by the tuning apparatus. That is, a wavelength drift of the average wavelength is considerably smaller than the selective tuning by means of the tuning apparatus. Thus, the comparatively slow drift of the average wavelength has no or no significant influence on the measurement accuracy of the laser system, in particular with respect to the velocity measurement of the object partially reflecting the laser radiation.

According to at least one embodiment, relative intensities of the M modes to each other vary by at most 10% or 5% or 1% or 0.2% during a tuning cycle of the tuning apparatus. That is, during a tuning cycle, the intensities of the M modes relative to each other are nearly constant. Thus, variations of the intensities of the M modes relative to each other exert no or no significant influence in particular on the velocity measurement of the object.

According to at least one embodiment, the semiconductor laser comprises a semiconductor layer sequence. The semiconductor layer sequence may be based on a III-V compound semiconductor material. For example, the semiconductor material is a nitride compound semiconductor material such as $Al_nIn_{1-n-m}Ga_mN$ or a phosphide compound semiconductor material such as $Al_nIn_{1-n-m}Ga_mP$ or also an arsenide compound semiconductor material such as $Al_nIn_{1-n-m}Ga_mAs$ or such as $Al_nGa_mIn_{1-n-m}As_kP_{1-k}$, wherein in each case $0{\leq}n{\leq}1$, $0{\leq}m{\leq}1$ and $n+m{\leq}1$ as well as $0{\leq}k<1$. For example, in this case, for at least one layer or for all layers of the semiconductor layer sequence, $0<n{\leq}0.8$, $0.4{\leq}m<1$, $n+m{\leq}0.95$ and/or $0<k{\leq}0.5$. In this context, the semiconductor layer sequence may comprise dopants as well as additional components. For simplicity, however, only the essential constituents of the crystal lattice of the semiconductor layer sequence, i.e. Al, As, Ga, In, N or P, are specified, even if these may be partially replaced and/or supplemented by small amounts of additional substances. In an embodiment, the semiconductor layer sequence is based on the material system AlInGaAs.

Furthermore, the semiconductor layer sequence may include exactly one active zone which is configured for generating the laser radiation, in particular by means of electroluminescence. The active layer contains in particular a multi-quantum well structure, in short MQW.

The laser radiation as a whole, viewed over all M modes, may include a spectral width of at most 1 nm or 5 nm or 0.2 nm, in particular as full width at half maximum, FWHM for short.

According to at least one embodiment, the laser system is free of an additional optical amplification component configured to post-amplify the laser radiation emitted by the semiconductor laser. In other words, the laser system may include only the semiconductor laser, the tuning apparatus, and the detector as optically active components and no further active intensity-changing or wavelength-changing components. This makes the laser system compact and inexpensive to set up.

According to at least one embodiment, the laser system is free of active thermal stabilization. This does not exclude that the laser system is applied to a heat sink or that a coarse tempering of the laser system is performed. Coarse temperature control means, for example, that a temperature of the semiconductor laser and/or the laser system is stabilized to 5° C. or more or to 10° C. or more, and not to tenths of ° C. as is sometimes common for DFB lasers.

According to at least one embodiment, the laser system further comprises light collecting optics. The light collecting optics is configured to collect the components of the laser radiation of the M modes that are reflected back to the laser system at the object and to guide them to the detector. The light collecting optics is configured to treat all M modes equally. That is, the light collecting optics is free of wavelength-selective optical elements, such as diffraction gratings or prisms.

Furthermore, an operating method for a laser system is specified. In particular, the method is used to operate a laser system as described in connection with one or more of the above embodiments. Features of the operating method are therefore also disclosed for the laser system, and vice versa.

In at least one embodiment, the method of operation comprises at least the following steps, particularly in the order indicated:

providing the laser system, and operating, in particular current feeding, the semiconductor laser, so that the M modes of the laser radiation are guided from the beam splitter in continuous wave operation to the detector on the one hand and to the object on the other hand, so that the detector for the M modes receives in each case the portions of the laser radiation reflected by the object as well as the portions of the laser radiation which come optically directly from the semiconductor laser. In this case, the operation or current feed of the semiconductor laser may be carried out in a continuous wave mode.

According to at least one embodiment, for all M modes, the portion of the laser radiation reflected from the object comprises an intensity $I_{n,R}$ and the portion optically directly from the semiconductor laser comprises an intensity $I_n$, wherein n takes any integer value between 1 and M, inclusive. The components $I_n$ and $I_{n,R}$ may be coherent to each other.

For a detector signal S at the detector, the following then may apply as a function of time:

$$S \sim \sum_{i=1}^{M} I_n I_{n,R} \cos xt$$

Thereby x refers to the angular frequency shift caused by the tuning apparatus, i.e, the difference frequency between the local oscillator and the signal reflected from the object.

In the above formula, a Doppler shift is not considered. Optionally, the Doppler shift can be included with an additional term. However, for a particularly simple distance measurement, and optionally a velocity measurement derived therefrom, the Doppler shift is optionally not taken into account.

The laser system described herein serves, for example, as a lidar in vehicles such as cars. Accordingly, the disclosure described herein also relates to a vehicle, in particular a car, comprising a laser system as described in connection with one or more of the embodiments mentioned above. Features of the laser system are therefore also disclosed for the vehicle.

In the following, a laser system described herein and an operating method described herein are explained in more detail with reference to the drawing by means of exemplary embodiments. Identical reference signs thereby specify identical elements in the individual figures. However, no scale references are shown, rather individual elements may be shown exaggeratedly large for better understanding.

BRIEF DESCRIPTION OF THE DRAWINGS

It shows:

FIG. 1 a schematic illustration of an exemplary embodiment of an operating method of a laser system described herein, FIG. 2 a schematic illustration of a time-dependent course of a wavelength for an operating method described herein, FIGS. 3 and 4 schematic sectional views of semiconductor lasers for exemplary embodiments of laser systems described herein, FIG. 5 a schematic wavelength dependence of a reflectivity for coatings for semiconductor lasers for laser systems described herein, FIGS. 6 to 9 schematic illustrations of an intensity as a function of wavelength of schematic emission spectra of semiconductor lasers for laser systems described herein, and FIG. 10 a schematic illustration of a signal as a function of time at a detector for laser systems described herein.

DETAILED DESCRIPTION

Figure 4:
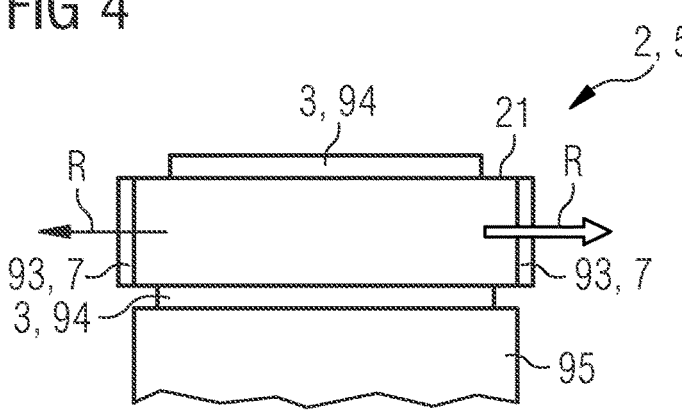

FIG. 1 illustrates an operating method for a laser system 1. The source of a laser radiation R in the laser system is a semiconductor laser 2. The laser radiation R comprises several modes of different wavelengths which are emitted simultaneously. That is, the laser radiation R is composed of radiation of different angular frequencies $w_n$.

A beam splitter 5 is arranged downstream of the semiconductor laser 2. The predominant portion of the laser radiation R passes through the beam splitter 5. The laser radiation R passing through the beam splitter 5 is guided to an object 6 and reflected back to a comparatively small extent from the object 6 toward the laser system.

By means of a light collecting optics 8, for example formed of a lens system, the reflected radiation is collimated. This reflected portion of radiation is guided via mirrors 92 and a lens 91 to a detector 4. The detector 4 may be a detector diode, in particular a photodiode. The detector 4 may be single-channel, but can also be multi-channel.

Likewise, the considerably smaller portion of the laser radiation R reflected at the beam splitter 5 reaches the detector 4, which is also guided via several mirrors 92 and the lens 91. This portion of radiation thus reaches the detector 4 optically directly from the semiconductor laser 2.

According to FIG. 1, a tuning apparatus 3 is mounted outside the semiconductor laser 2 and after the beam splitter 5. By means of the tuning apparatus 3 the modes of the laser radiation R are periodically slightly changed in their frequency. Deviating from the illustration of FIG. 1, the tuning apparatus 3 can also be monolithically integrated in the semiconductor laser 2.

The beam paths within the laser system 1 illustrated in FIG. 1 are purely exemplary. For example, it is possible that the portion of radiation R reflected by the beam splitter 5 is the larger portion of radiation and is guided to the object 6 and not the portion of radiation passing through the beam splitter 5. Furthermore, if not integrated in the semiconductor laser 2, the tuning apparatus 3 may also be placed in front of the beam splitter 5.

Figure 10:
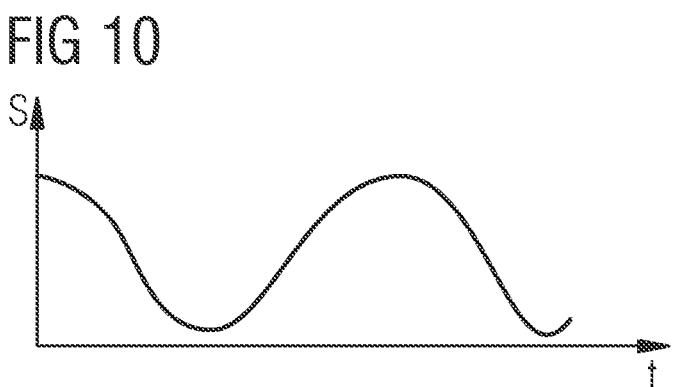

The laser radiation R reflected and collected by the object 6 is mixed at the detector 4 with the radiation coming optically directly from the semiconductor laser 2. This results in a signal S at the detector 4, the time course of which can provide information about a distance of the object 6, related to the laser system 1. An exemplary course of the signal S in time t is illustrated in FIG. 10.

In particular, if a Doppler frequency shift is additionally detected upon reflection of the laser radiation at the object 6, a relative velocity of the object 6 to the laser system 1 can be determined. However, the relative velocity can also be calculated from two distance measurements taken in quick succession.

Thus, after passing through the tuning device 3, the laser radiation R comprises a frequency $f_{PO}$ which is equal to a sum of the frequency of the laser radiation $f_{LO}$ as emitted by the semiconductor laser 2 and a change in frequency due to the tuning apparatus 3, referred to as $f_{OFFSET}$: $f_{PO} = f_{LO} + F_{OFFSET}$. A frequency of the reflected light $f_a$ is then obtained as $f_a = f_{LO} + f_{OFFSET} + \Delta f$, wherein $\Delta f$ is the frequency change due to a movement of the object 6.

With the semiconductor laser 2 described here, an FMCW lidar system with a range, in terms of a focused beam, of more than 200 m can be achieved. Optical power in the region of more than 100 mW to about 1 W is required for this. However, common single mode lasers, especially edge emitters like DFB lasers, DBR lasers and ECL, are usually limited to some 10 mW to 100 mW. Alternative solutions with higher output lasers such as fiber lasers, especially EDFA lasers, on the other hand, are relatively cost-intensive.

Compared to the usual ECL single mode lasers with a corresponding coherence length and low optical power of only some 10 mW, a semiconductor laser 2 is used which is operated longitudinally multimode. This semiconductor laser 2 may be free of complex DFB grating structures or DBR grating structures or comprises at best a more cost-effective higher order grating which selects only a few modes and is easier to realize.

Thereby, the longitudinal mode distance is much larger than the frequency modulation of the FMCW system. For a semiconductor laser 2 based on the material system GaAs this means: With a frequency distance D of the modes to each other with $D = C_0/(2L_0/N)$ with $L_0/N$ equal to the effective resonator length of the laser diode and for a system with a wavelength variation w of about 1 GHz and assuming that the mode distance D is much larger than 5 GHZ, a maximum geometrical cavity length of the semiconductor laser 2 at a refractive index of N of about 3.2 of less than about 10 mm is obtained. With such a cavity length, high gain and low linewidth per mode can already be achieved in the sub-MHz region.

By not using a high-precision grating, the laser can be produced at low cost. The lower losses due to the absence of a grating allow a higher laser output power and thus, if necessary, the elimination of additional optical amplifier components, which can nevertheless optionally be included in the laser system.

Thereby, the laser is either directly frequency modulated, wherein this concerns all modes identically. Alternatively, an indirect frequency modulation is performed by means of the external tuning apparatus 3, as illustrated in FIG. 1. This modulation also applies identically to all modes. In this case, the frequency modulation $\Delta w$ is much smaller than the mode distance D.

The following mixing then takes place in the detector 4, calculated using the example of only two laser modes, i.e. M=2:

Hereafter, $w_1$ stands for the frequency of the first mode, $w_2$ for the frequency of the second mode. x stands for the shift of the frequency due to the frequency modulation. $E_1$ and $E_3$ are the powers of the modes in detector 4, i.e, the powers on the direct path and the powers of the local oscillator, respectively. $E_2$ and $E_4$ are the powers of the modes reflected from the object 6.

For the signal S at detector 4, we then obtain:

$$S \sim [E_1 \sin(w_1 t) + E_2 \sin((w_1 + x)t) + E_3 \sin(w_2 t) + E_4 \sin((w_2 + x)t)]^2$$

$E_1$ and $E_2$ on the one hand and $E_3$ and $E_4$ on the other hand are usually coherent with each other. $E_1$ and $E_2$ are usually not coherent with $E_3$ and $E_4$.

This results in the relevant term for the signal S:

The square frequencies and the sum frequencies, i.e. high THz and nm, respectively, are not detected in the slow detector and thus yield a portion of 0;

$S \sim E_1 E_2 \cos(xt) + E_3 E_4 \cos(xt)$, wherein the mixed products between $E_1$-$E_3$, $E_1$-$E_4$, $E_2$-$E_3$ and $E_2$-$E_4$ are also too fast for the detector, since these differences correspond approximately to the mode distance D, which is much larger than the bandwidth of detector 4.

In contrast to a longitudinal single-mode system with $S\sim E_1E_2 \cos(xt)$, additional signal strength can be gained with the semiconductor laser described here, especially since the lossy installation of a mode selection grating is not necessary. In addition, thermal stabilization is not required.

Furthermore, laser diodes can be used in a wide wavelength range, in particular in the entire wavelength range accessible to GaAs semiconductor lasers. In particular, this is the region from about 900 nm to 1000 nm.

FIG. 2 schematically illustrates the course of a wavelength $\lambda$ of a mode versus time t for the laser radiation R as emitted by the laser system 1, see the solid line, and for the reflected laser radiation reflected back from the object, see the dash line. It can be seen that the wavelength variation $\Delta w$ is performed periodically due to the tuning apparatus 3. Due to the movement of the object 6, an additional small circular frequency shift $\Delta f$ occurs.

Instead of a ramp-shaped frequency modulation with small emission pauses, as exemplarily illustrated in FIG. 2, a continuous sinusoidal or triangular frequency modulation can also be performed.

FIG. 3 illustrates an example of a semiconductor laser 2 for laser systems 1 described herein. The semiconductor laser 2 comprises a semiconductor layer sequence 21 in which an active zone 22 is located. A mode limiting apparatus 7 is provided on or in the semiconductor layer sequence 21. The mode limiting apparatus 7 is a higher order grating, which can be produced comparatively inexpensively since only relatively large structures need to be generated.

The exemplary semiconductor laser 2, as illustrated in FIG. 4, also comprises a semiconductor layer sequence 21 in which there is an active zone which is not drawn. A geometrical length of the semiconductor layer sequence 21 along a resonator, and thus along an emission direction, is in a region around 8 mm. Electrodes 94 are provided on the semiconductor layer sequence 21 for varying the emission wavelength. An operating current can be varied via the electrodes 94, so that the variation $\Delta w$ of the wavelengths of the modes is performed.

Figure 5:
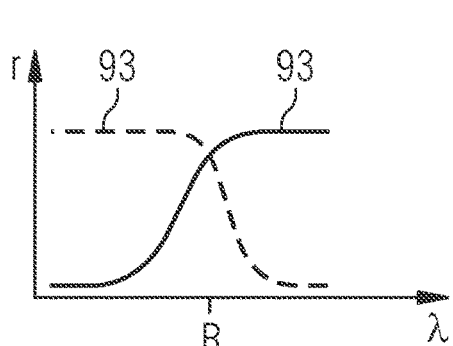

Optionally, it is possible that optically effective coatings 93 are located on facets of the semiconductor layer sequence 21. These coatings 93 can show different courses of a reflectivity r depending on the wavelength $\lambda$, see FIG. 5. Via such optional coatings a mode limiting apparatus can be realized.

Furthermore, it is illustrated in FIG. 4 that the semiconductor laser 2 is mounted on a carrier 95, wherein the carrier 95 is a heat sink or a comparatively imprecisely thermally controlled carrier.

Optionally, as in all other exemplary embodiments, the semiconductor laser 2 itself may act as a beam splitter 5, as illustrated in FIG. 4. That is, the laser radiation R can exit at both facets of the semiconductor layer sequence 21 with different intensities. The side on which the far predominant portion of radiation is emitted faces the object 6 and the far smaller portion runs in the direction toward the detector 4, not drawn in FIG. 4.

FIGS. 6 to 9 show exemplary different spectra of the laser radiation R as generated by the semiconductor laser 2. The laser radiation R is composed of several modes each. The M modes comprise angular frequencies $w_1$ to $w_M$. A mode distance D is for example above 10 GHZ, a wavelength variation $\Delta w$ due to the tuning device 3 is for example in the region around 1 GHz.

Figure 6:
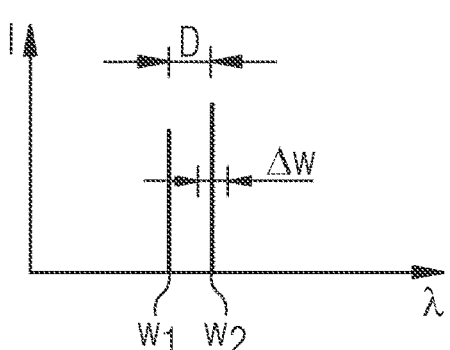
Figure 7:
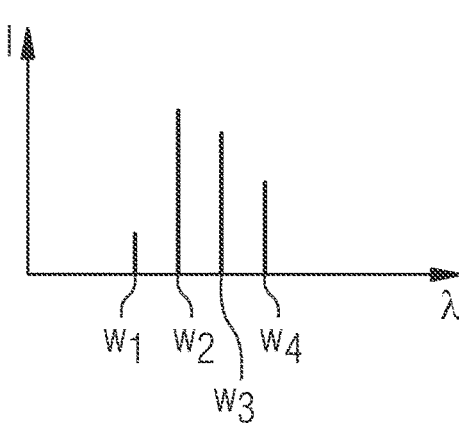

In FIG. 6 it can be seen that the laser radiation R comprises only two modes. The two modes may include similar intensities. In contrast, according to FIG. 7, four modes are present. The intensities of the modes can optionally vary.

Figure 8:
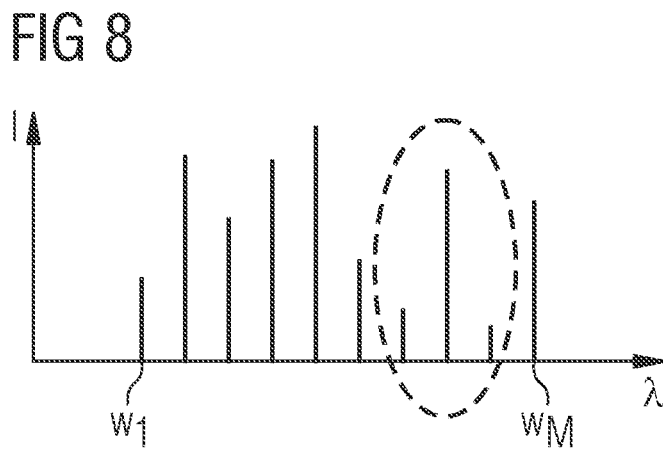
Figure 9:
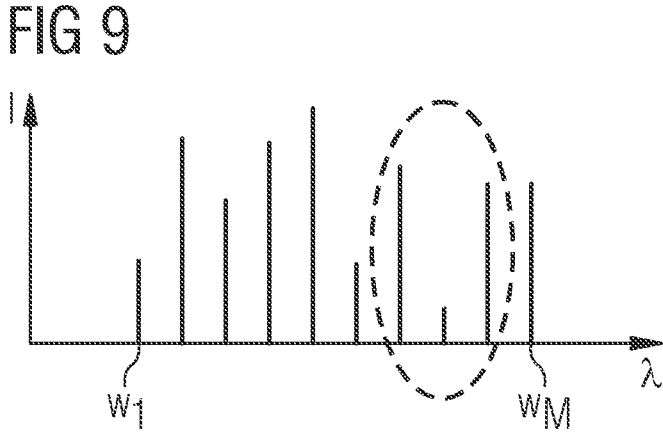

FIGS. 8 and 9 illustrate an emission spectrum in which the intensities of the individual modes vary with time in a sub-region. This sub-region is marked by a dash line. Such intensity variations occur in particular when no mode limiting apparatus is present and when a comparatively large number M of modes is present. However, as long as these variations of the intensity ratios happen on a comparatively large time scale and thus proceed in particular slowly with respect to the wavelength variation $\Delta w$ due to the tuning apparatus 3, a measurement accuracy of the laser system 1 is not or not very much affected by these intensity variations.

The components shown in the figures may follow one another in the sequence indicated, in particular immediately one after the other, unless otherwise described. Components not touching each other in the figures may include a distance from each other. Insofar as lines are drawn parallel to one another, the associated surfaces may be likewise aligned parallel to one another. Furthermore, the relative positions of the drawn components with respect to each other are correctly reproduced in the figures, unless otherwise described.

The invention described herein is not limited by the description based on the exemplary embodiments. Rather, the invention encompasses any new feature as well as any combination of features, which particularly includes any combination of features in the patent claims, even if that feature or combination itself is not explicitly specified in the patent claims or exemplary embodiments.

LIST OF REFERENCE SIGNS

1 laser system
2 semiconductor laser
21 semiconductor layer sequence
22 active zone
3 tuning apparatus
4 detector
5 beam splitter
6 object
7 mode limiting apparatus
8 light collecting optics
91 lens
92 mirror
93 coating
94 electrode
95 carrier
D mode distance (frequency distance)
I intensity
L resonator length
$\lambda$ wavelength
r reflectivity
R laser radiation
S signal at detector
t time
$w_n$ angular frequencies of the modes of the laser radiation
$\Delta w$ wavelength variation due to the tuning apparatus
$\Delta f$ angular frequency shift due to the object

The invention claimed is:

1. A laser system comprising:
a semiconductor laser configured to emit laser radiation in continuous wave operation in M modes with mutually different angular frequencies, M being a natural number and $2 \leq M \leq 30$;

a tuning apparatus configured to periodically change the angular frequencies so that a variation of each of the angular frequencies is smaller by at least a factor of 2 than a mode distance between respective adjacent angular frequencies, wherein the mode distance is a spacing difference between one angular frequency of one mode to a next nearest angular frequency of another nearest mode of the M modes;

a detector whose upper cutoff frequency is smaller by at least a factor of 10 than a smallest one of the mode distances; and a beam splitter configured to guide the M modes of the laser radiation in each case to the detector and to an object, so that the detector is also configured to detect, for the M modes, in each case portions of the laser radiation reflected by the object as well as portions of the laser radiation which come optically directly from the semiconductor laser.

2. The laser system according to claim 1, wherein the laser system is a frequency modulated continuous wave lidar system, such that the detector is configured to detect, on the basis of the M modes, an angular frequency shift which occurs upon reflection of the laser radiation at the object, in order to determine a distance and/or radial velocity of the object relative to the laser system.

3. The laser system according to claim 1, wherein a resonator of the semiconductor laser comprises a geometric resonator length ranging from 5 mm to 10 mm, inclusive, wherein the geometric resonator length is defined by facets of the semiconductor laser.

4. The laser system according to claim 1, further comprising a mode limiting apparatus configured to limit M to at most 5 such that: $2 \leq M \leq 5$.

5. The laser system according to claim 4, wherein the mode limiting apparatus comprises a higher order diffraction grating, wherein the mode limiting apparatus is integrated in the semiconductor laser.

6. The laser system according to claim 1, wherein the semiconductor laser is free of a mode limiting apparatus such that: $6 \leq M \leq 20$.

7. The laser system according to claim 1, wherein the tuning apparatus is at least partially integrated in or on the semiconductor laser.

8. The laser system according to claim 7, wherein the tuning apparatus is configured to vary an operating current intensity of the semiconductor laser.

9. The laser system according to claim 1, wherein the tuning apparatus is located completely outside the semiconductor laser and/or at a distance from the semiconductor laser.

10. The laser system according to claim 1, wherein:

the mode distances are each greater than 5 GHz and less than 0.9 THz;

the variations of each of the angular frequencies due to the tuning apparatus each range from 0.2 GHz to 4 GHz inclusive;

mode widths of the M modes are each less than 1 MHz;

an average wavelength of the laser radiation ranges from 850 nm to 1600 nm, inclusive; and a temporal change of the average wavelength is smaller by at least a factor $10^3$ than a temporal change of the angular frequencies due to the variation by the tuning apparatus.

11. The laser system according to claim 1, wherein relative intensities of the M modes to each other vary by at most 1% during a tuning cycle of the tuning apparatus.

12. The laser system according to claim 1, wherein a semiconductor layer sequence of the semiconductor laser comprises exactly one active zone.

13. The laser system according to claim 1, wherein the laser system is free of an additional optical amplification component configured to post-amplify the laser radiation emitted by the semiconductor laser, and free of an active thermal stabilization.

14. The laser system according to claim 1, further comprising light collecting optics for the portions of the laser radiation of the M modes reflected back to the laser system at the object, wherein the light collecting optics are configured to treat all M modes equally.

15. A method for operating a laser system according to claim 1, wherein the method comprises:

providing the laser system; and current feeding the semiconductor laser, so that from the beam splitter in continuous wave operation the M modes of the laser radiation are guided respectively to the detector and to the object, so that the detector for the M modes receives in each case the portions of the laser radiation reflected by the object and also the portions of the laser radiation which come optically directly from the semiconductor laser.

16. A laser system comprising:

a semiconductor laser configured to emit laser radiation in continuous wave operation in M modes with mutually different angular frequencies, M being a natural number;

a tuning apparatus configured to periodically change the angular frequencies so that a variation of each of the angular frequencies is smaller by at least a factor of 2 than a mode distance between respective adjacent angular frequencies, wherein the mode distance is a spacing difference between one angular frequency of one mode to a next nearest angular frequency of another nearest mode of the M modes;

a detector whose upper cutoff frequency is smaller by at least a factor of 10 than a smallest one of the mode distances; and a beam splitter configured to guide the M modes of the laser radiation in each case to the detector and to an object, so that the detector is also configured to detect, for the M modes, in each case portions of the laser radiation reflected by the object as well as portions of the laser radiation which come optically directly from the semiconductor laser, wherein the laser system further comprises a mode limiting apparatus configured to limit M to at most 5 such that $2 \leq M \leq 5$, or the laser system is free of a mode limiting apparatus and either $6 \leq M \leq 20$ or $11 \leq M \leq 30$.

* * * * *